May 19, 1970  R. F. NELSON  3,512,477

MATCHED ROLL REGISTRY SYSTEM

Filed Aug. 21, 1967  3 Sheets-Sheet 1

INVENTOR.
ROBERT F. NELSON
BY
Cushman, Darby & Cushman
ATTORNEYS

May 19, 1970     R. F. NELSON     3,512,477
MATCHED ROLL REGISTRY SYSTEM
Filed Aug. 21, 1967     3 Sheets-Sheet 2
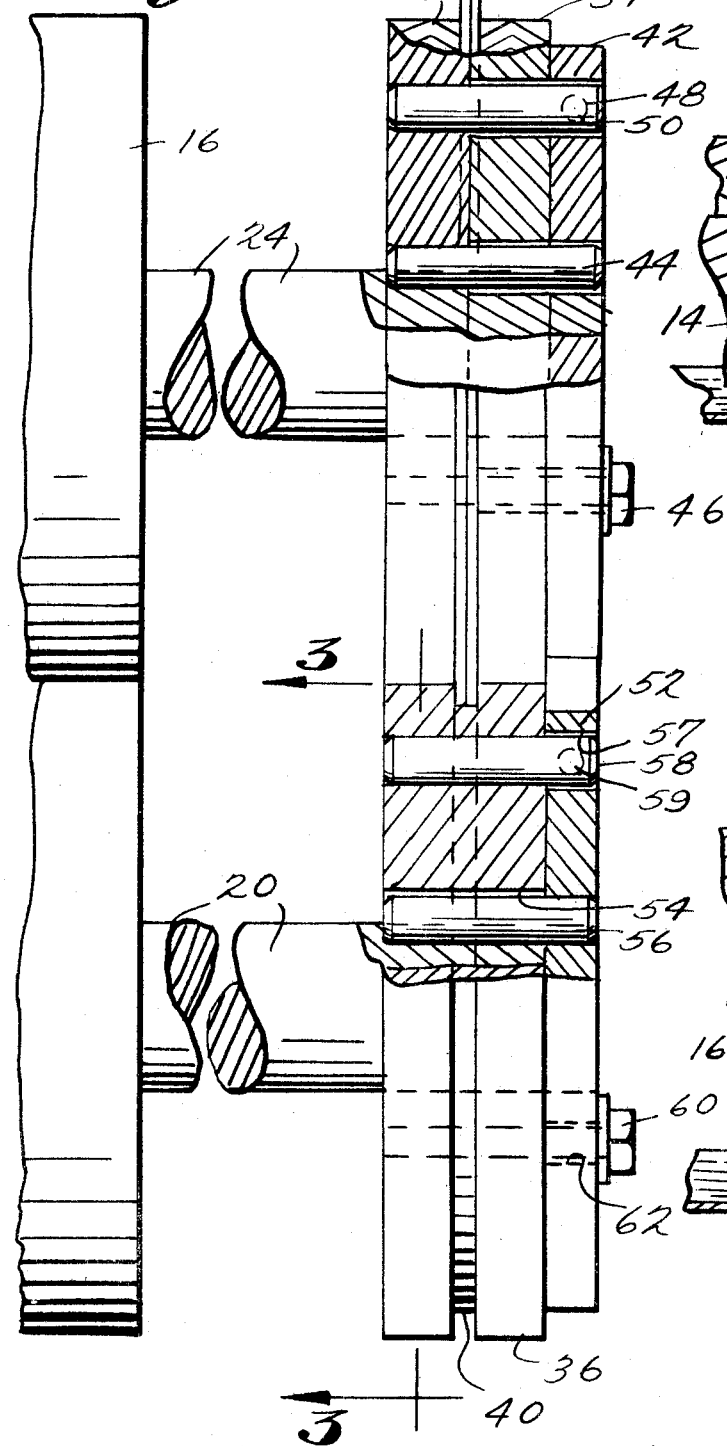
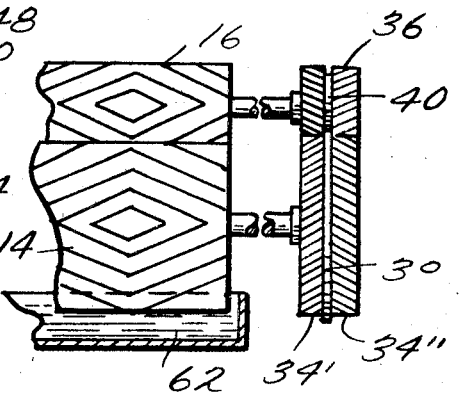
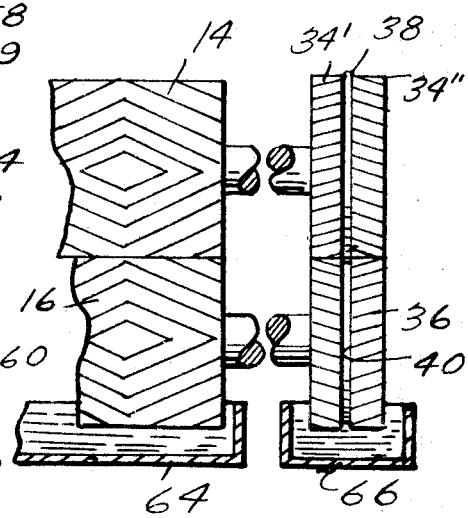
INVENTOR.
ROBERT F. NELSON
BY
Cushman, Darby & Cushman
ATTORNEYS May 19, 1970 — R. F. NELSON — 3,512,477

MATCHED ROLL REGISTRY SYSTEM

Filed Aug. 21, 1967 — 3 Sheets-Sheet 3

INVENTOR.
ROBERT F. NELSON
BY
Cushman, Darby & Cushman
ATTORNEYS

United States Patent Office 3,512,477
Patented May 19, 1970

3,512,477
MATCHED ROLL REGISTRY SYSTEM
Robert F. Nelson, Westfield, N.J., assignor to Modern Engraving & Machine Corporation, Hillside, N.J., a corporation of New Jersey
Filed Aug. 21, 1967, Ser. No. 661,899
Int. Cl. B44b 5/00; F16h 55/18; B41f 13/24
U.S. Cl. 101—23                                          2 Claims

ABSTRACT OF THE DISCLOSURE

Apparatus for rotary embossing and engraving having structure for securing and maintaining longitudinal and circumferential alignment of the rolls involved, by separate gears on the respective roll shafts. One of the gears is split and adjustable to obtain positive wedging of the teeth of both gears to prevent backlash. Either of the gears has a tongue and the other a groove to prevent longitudinal play.

---

This invention relates to gear apparatus and the method of using such apparatus on rolls mounted for rotary motion in an embossing or engraving machine and in particular to longitudinal and circumferential alignment of such rolls during the process of engraving them and when the rolls are being used to emboss a given web.

The improved method and apparatus discloses a relationship between first and second gear means mounted respectively upon rolls of an engraving or embossing machine whereby one of the gear means is split and the split gears thereof are rotatably adjusted in such a manner as to wedge the teeth of the other gear means to prevent circumferential backlash. Longitudinal play is prevented by the improvement of a tongue and groove arrangement between the gears.

It is understood in the art that an embossing machine employs two matched embossing rolls to emboss a web travelling therebetween. To make these rolls, a regular embossing machine may be used, but generally a similar machine, which is less elaborate especially in its speed capabilities and which is called an engraving machine, is used. In either machine, a patterned transfer roll is used to engravingly transfer its pattern to a second roll of similar construction to effect the first or second one of the two embossing rolls, according to whether the patterned transfer roll is a master roll or the first embossing roll of a set of matched embossing rolls being made. Generally, as set forth in the Sunderhauf et al. Pat. 2,662,002 and Nelson Pat. 3,048,512, a resist-coating acid-etching process is used to transfer the pattern from the master roll to the first embossing roll and therefrom to the second embossing roll.

In the process of etching the first or second embossing roll, any longitudinal or circumferential movement between the pattern roll and the embossing roll being made will result in a poor quality or ruinous transfer of the pattern.

A similar problem exists when the embossing machine is in operation and a web is being embossed. When the machine is in operation any circumferential or longitudinal motion of even one thousandth of an inch between the rolls will sometimes result in a mutilated transfer of the pattern to the material. Such mutilation can be severely downguide the web, sometimes to the point of worthlessness. It therefore becomes evident that elimination of such longitudinal or circumferential motion is of significant concern to the embossing and engraving industry.

There are five situations when it is desirable to adjust the fitting of the gear means in an engraving or embossing machine to eliminate longitudinal or circumferential motion. Such motion can be eliminated through eliminating any longitudinal play and circumferential play between the gears of each of the rolls.

First, when a first embossing roll as is disclosed in the above-mentioned Nelson Pat. No. 3,048,512 is being engraved by means of a master roll, circumferential and longitudinal alignment must be exact to insure the exact transfer of the pattern. At present only helical or herringbone gears are the primary means of achieving such alignment. While such gears do prevent a certain amount of play, the problem of backlash and longitudinal play persists.

Secondly, backlash occurs when the pattern is transferred from the first embossing roll (made as in the preceding paragraph) to a potential second embossing roll. Standard helical or herringbone gears are used here with the same disadvantages heretofore noted. The present invention improves upon the process of transferring the pattern by eliminating any play when the rolls and gears are being mated.

A third problem arises in realigning the rolls after disengagement. The prior art does not disclose means of adjusting and maintaining alignment if disalignment does occur. Because alignment may be a question of a few thousandths of an inch, disalignment is possible.

Fourthly, disalignment can occur when the driving gear means mounted respectively on each of two matched embossing rolls are inevitably separated in the embossing process.

It is well understood that webs of different widths can be employed in the embossing process without changing the pattern or the size of the gears driving the rolls upon which the pattern is etched. However, when the rolls are separated to allow for various widths of webs, the gears mounted on said roll are also separated and the teeth become partially disengaged and meshing contact at the pitch line between the separate gear means becomes impossible. When this occurs backlash may be evidenced, and heretofore there have been no means to eliminated it. The present invention does eliminate it by eliminating all space between the gear means; thus causing the gears to mesh with continuous contact.

Finally, there is the problem of eliminating circumferential backlash and longitudinal play when the gears have become worn and the teeth have lost the effect of any pitch line they once had. The present practice requires the esxpensive process of re-etching the rolls and gears or discarding both when the gears become worn.

SUMMARY

The apparatus of the invention includes an embossing or engraving roll having gear means capable of meshing with the gear means of a second embossing or engraving roll to prevent circumferential backlash and horizontal play between the rolls, and an embossing or engraving machine having a roll registry system wherein the operation and construction of the two gear means mounted respectively on the first and second roll which are used to rotate the first roll relative to the second, eliminate circumferential and longitudinal backlash and assure proper alignment of said rolls when said rolls are being engraved or when they are being used in the embossing process.

The two gear means have a cooperative tongue and groove arrangement to prevent longitudinal play between the rolls, and one of the gear means includes first and second gears each of which mesh with the other gear means. The first gear is fixedly secured by any suitable means to either roll and the second gear is rotatably adjustably secured to the first gear so that by rotating and securing the second gear relative to the first when the first and second gear means are meshing, the teeth of the first and second gear wedge the teeth of the other gear means.

An improvement in the method of producing and using embossing or engraving rolls is disclosed in the prevention of longitudinal or circumferential play or backlash between the master roller and the first embossing roll or engraving transfer roll, and between first and second embossing or engraving rolls, by the steps of rotatably producing a vice-like fit between respective gears of said rolls which have been longitudinally locked by a tongue and groove arrangement.

The entire scope of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

The invention will be understood more readily by reference to the accompanying drawings; however, these drawings are intended to illustrate the invention and are not to be construed to limit the scope of the invention.

DESCRIPTION OF THE PREFERRED EMBODIMENTS

FIG. 2 is an enlarged partially sectioned side elevational view of the adjustable gear arrangement and a portion of the relative shafts and embossing or engraving rolls shown in FIG. 1.

FIG. 5 is a side elevational view of a master engraving roll and gear means and an engraved roll and gear means with said engraved roll being dipped into an acid bath.

FIG. 6 shows the second engraved roll and its gear being dipped into an acid bath.

Figure 1:
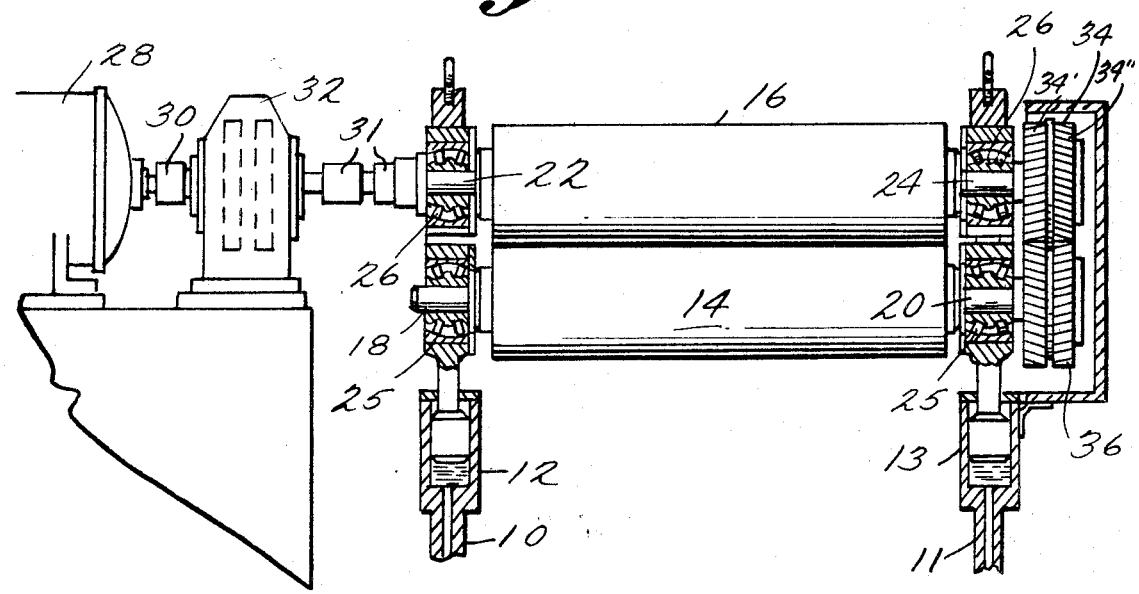
FIG. 1 is a partially sectioned side elevational view of an embossing or engraving machine.

In FIG. 1, an embossing machine incorporating the present invention, and of the general type shown in the aforementioned Sunderhauf et al. Pat. 2,662,002 the disclosure of which is incorporated herein, includes legs 10 and 11 having respective hydraulic cylinders 12 and 13 for raising and lowering roll 14 which is engraved from and matched with roll 16.

Roll 14 carries shafts 18 and 20 and roll 16 shafts 22 and 24. Bearing means 25 at each end of roll 14 support shafts 18, 20, and bearing means 26 at each end of the roll 16 support shafts 22, 24. Roll rotating means are shown in the form of a conventional electric motor 28, which is drivingly connected by suitable shafts 30, 31 and said gear means 32, to shaft 22 of the upper roll. It will thus be seen that the actuation of motor 28 causes rotation of the upper roll 16 within the bearing means 26.

A gear 34 is affixed to shaft 24 of the upper roll, and is shown engaged with gear 36 of the lower roll 14. This gearing arrangement assures that the lower roll 14 will be drivingly rotated with the upper roll as the latter is rotated by the motor 28.

In the illustration, gear 34 is shown to be comprised of two justaposed gears 34' and 34", as shown in more detail in FIG. 2.

FIG. 2 discloses an enlarger partially sectioned side elevational view of the gears 34 and 36 mounted on roll shafts 24 and 20, respectively. The matched rolls 14 and 16 are shown in an engaged position, and the gears 34 and 36 are shown to be meshed. Helical gears as shown are the preferred gear means, though other types may be used if desired. Gear means 34 is shown to have a circumferential tongue 38 which is mated with a circumferential groove 40 on gear means 36. Gear means 34 is shown to be composed of two independent helical gears 34' and 34" and gear means 36 is shown to be a double helical or herringbone gear.

A yoke or plate 42 is located on the face of helical gear 34". This plate may be a phyical extension of gear 34" or may be a separate embodiment securely affixed to the face of gear 34" by any suitable means.

Gear 34' is secured to shaft 24 by any suitable means such as a pressure fit pin 44. Yoke 42 and adjustable gear 34" are secured to gear 34' by means of four bolts 46 (only one shown) which pass through respective arcuate slots 64 in yoke 42 and gear 34". When bolts 46 are loose, rotary adjustment of gear 34" relative to gear 34' may be made by turning upper and lower cap screws 48 against a respective pin 50 (only one shown), which is fixedly secured in gear 34', while loosening cap screws 49 (FIG. 4), or vice-versa.

Because clearance is provided around the pressure fit pin 44, the four securing bolts 46 and pins 50, where these elements pass through gear 34" and yoke 42, gear 34" and yoke 42 can rotate about shaft 24.

It is readily understood that the shaft 24, gear 34', and the elements 44, 46 and 50 which are embedded in gear 34' do not rotate.

After the turning of the cap screws have revolved gear 34" relative to gear 34' the desired distance, the four bolts 46 are tightened down and gear 34" becomes fixedly secured to gear 34' and turns therewith.

Mounted on gear means 36 is an adjustable yoke or plate 52 which is securely affixed to shaft 20 by any suitable means. Yoke 52 is capable of being independently rotated relative to gear means 36.

The purpose for revolving the shaft and roll by means of adjustable plate 52 realtive to gear 36 is so that when gear 36 is locked with gear means 34 registry adjustments can be made to refine the mating fit between rolls 14 and 16. Gear means 36 is secured to yoke 52 by means of four bolts 60 (one of which is shown) which pass through respective arcuate slots in yoke 52. An arcuate slot 54 is located about pin 56 in gear means 36, which corresponds to pins 44 in gear means 34.

Because clearance 54 is provided around the pin 56 where that said pin passes through gear means 36, and clearance is also provided about the four securing bolts 60 and pin 58, which corresponds to pins 50 in gear means 34, where said bolts and pin pass through adjustable yoke 52, when bolts 60 are loosened rotary adjustment of the shaft 20 and consequently roll 14 relative to gear 36 may be made by turning the upper and lower cap screws 59 against respective pin 58 which is secured to means 36, while loosening the cap screws 61 (FIG. 4) or vice-versa. After the turning of the cap screws has revolved yoke 52 and the shaft 20 to which it is affixed and roll 14 to which said shaft is affixed the desired distance, the four bolts 60 are tightened down and gear 36 becomes affixedly secured to yoke 52 and shaft 20 and turns therewith.

Figure 3:
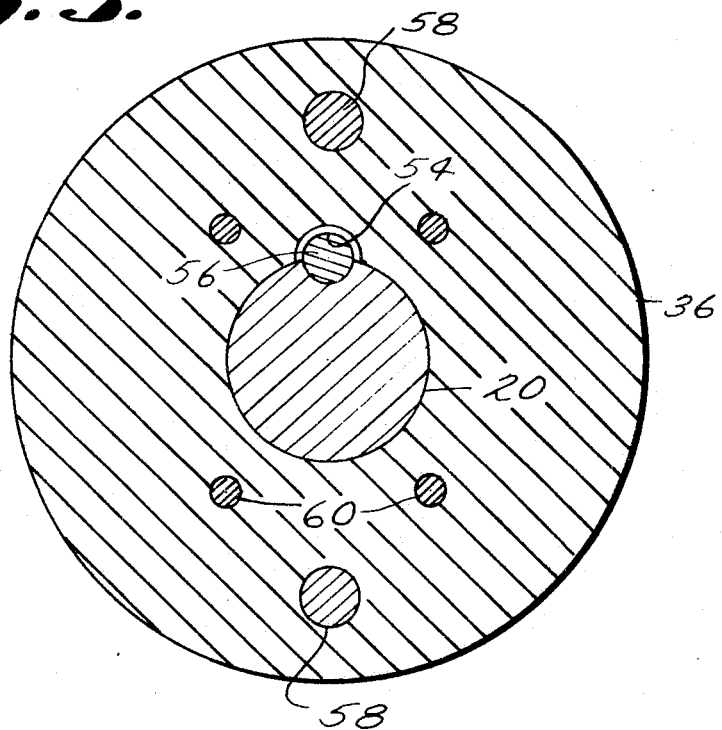
FIG. 3 is a cross sectional view along line 3—3 of FIG. 2.

FIG. 3 is a cross sectional view along line 3—3 of FIG. 2 of shaft 20, pin 56 and gear 36. This view shows arcuate clearance 54 around pin 56 in that portion of the gear means through which pin 56 travels when yoke 52 (no shown in FIG. 3) is rotated.

Figure 4:
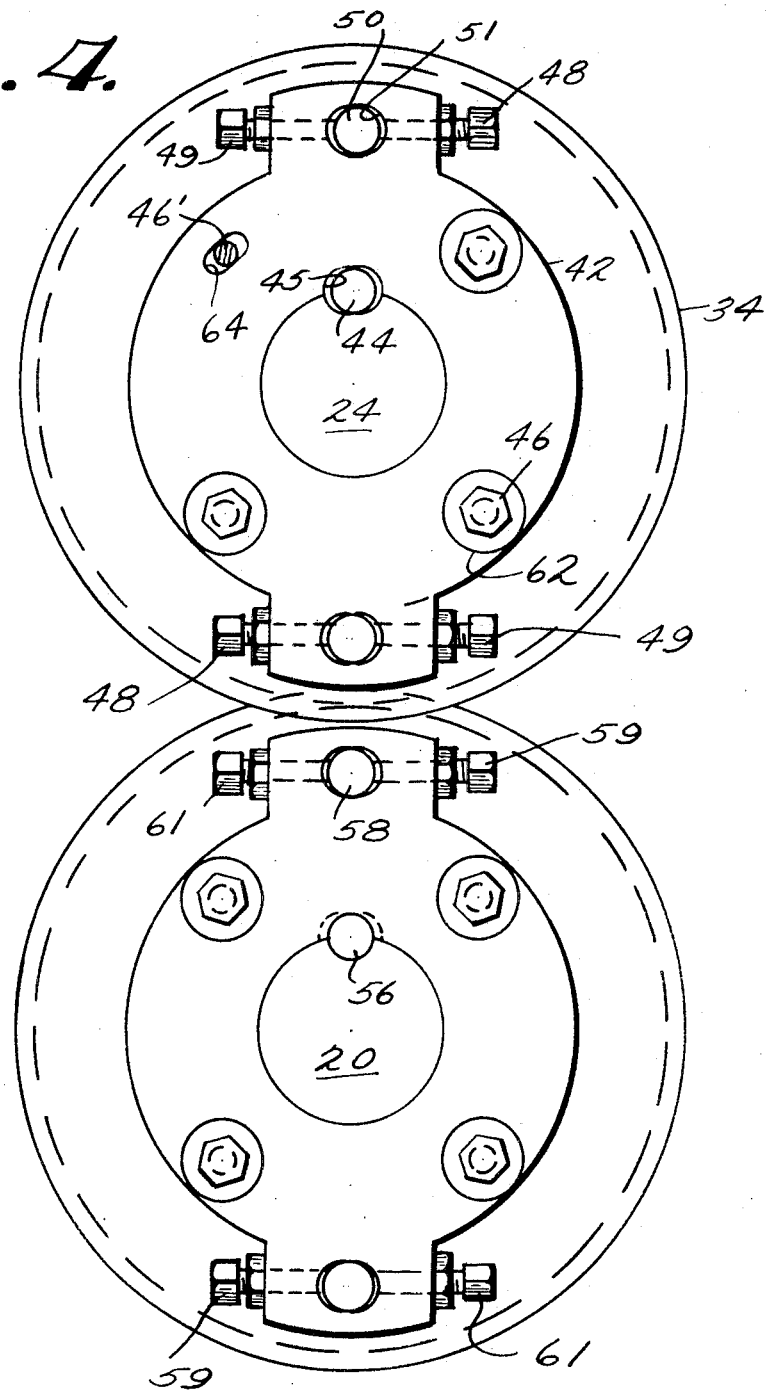
FIG. 4 is an end elevational view of the adjustable gear arrangement of FIGS. 1 and 2.

FIG. 4 is an end elevational view of the adjustable means 34 and 36 as shown in FIGS. 1 and 2. In the illustration bolts 46 are shown with washers 62.

The four bolts 46 on yoke 42 are moved through arcuate slots 64. Bolt 46' is shown with the washer and bolt head removed to illustrate the arcuate slot 64. Similar arcuate slots 45 and 51 are shown about pins 44 and 50, respectively. There are similar arcuate slots around pin 58 and the four bolts 60, but there is no arcuate slot shown around pin 56 in adjustable yoke 52.

The means for turning gear 34' and yoke 42 can be clearly seen in FIG. 4 by turning cap screws 48 in one direction and cap screws 49 in the other against respective pins 50, the gear 34" and yoke 42 affixed thereto will rotate. Similarly, it can be seen that turning cap screws 59 in one direction and cap screws 61 in the other direction that adjustable yoke 52 will turn and that shaft 20 will turn with it.

FIG. 5 shows a portion of an embossing or engraving machine with a roll registry system as shown in FIG. 1 wherein roll 16 is a master roll and roll 14 is an embossing or engraving transfer roll. The only difference shown in the arrangement in FIG. 5 relative to FIG. 1 is that split gear means 34 is on roll 14 rather than roll 16.

It is to be understood that split gear 34 could be on either roll. It may be preferred however to place the split gear upon the first embossing roll 14 as it may then be utilized to align both the first embossing roll with the master roll and then again the first embossing roll with the second embossing roll which is cut from the first embossing roll. The diameter of the master roll is related by a whole number hereto to the diameter of roll 14.

The use of a master roller as is illustrated allows the embossing or engraving rolls to be prehardened to any desirable depth. The process of using a master roller to transfer the pattern to the first embossing or engraving roll is disclosed in Pat. No. 3,048,512 to Nelson of Aug. 7, 1962. In that patent the driving gears are not shown, but refernece is made for use of such gears to Pat. No. 2,662,002 to Sunderhauf of Dec. 8, 1953. It will be well recognized that while the Sunderhauf patent provides for gears, no means are disclosed for maintaining circumferential and longitudinal alignment when said gears are utilized. In the drawings, it will be seen that only the embossing roll 14 is immersed in an acid bath 62. Such immersion of the gears is unnecessary as there is no need for refining the matching fit between gears 34 and gears 36.

FIG. 6 shows the step of engraving a second embossing roll 16 from a first embossing roll 14. The embossing or engraving machine and roll registry system partially shown in FIG. 6 is of the same type shown in FIG. 1. The only difference is that the top roll in FIG. 6 is designated as 14 and the bottom roll is designated as roll 16 whereas in FIG. 1, the top roll is 16 and the bottom roll 14. The split gear means 34 is shown on roll 14 and the double helical or herringbone gear means 36 is shown on roll 16. By relating FIG. 6 to FIG. 5, it can be seen that roll 14 with the split gears 34 to which the pattern is being transferred from master roll 16 in FIG. 5 is transferring the same pattern to roll 16 in FIG. 6 in a subsequent step of the engraving process. As such arrangement is utilized, split gear means 34 may be used to align both master roll 16 and the second embossing roll 16. In FIG. 6, the second gear means 36 as well as roll 16 are shown by dipping into said baths 64 and 66, respectively. This step refines the fit between gear 36 and gear 34, but such refinement does not obviate the need for locking gears 34' and 34'' to prevent circumferential backlash and the tongue 38 and groove 40 arrangement on the first and second gear means to prevent longitudinal backlash.

The novel means for maintaining circumferential and longitudinal alignment of matched roll and engraving or embossing machine will now be reviewed. It will be well recognized by one skilled in the art that in the process of engraving or embossing, one roll is driven by a motor and through gear means the first roll drives a second roll. Referring again to FIG. 1, it can be seen that the top roll 16 is turned by motor 28 and that gear means 34 in turn drives gear means 36 and roll 14 to which it is secured. In the process of engraving or embossing, it is necessary that the pattern on the engraving roll correspond exactly with the patterned portions engraved or being engraved on the embossing roll. If there is any longitudinal or circumferential backlash in the gears and the rolls slip, the pattern and/or web or mat may be mutilated or destroyed.

The novel means of this invention prevents such backlash.

Longitudinal alignment is maintained by a tongue and groove arrangement in the gear means which drivingly connect the engraving roll to the engraved roll. Referring to FIG. 2, it can be seen that the tongue 38 in gear means 34 fits securely into groove 40 in gear means 36. This arrangement prevents longitudinal movement of the gear means, and because the gears are securely affixed to respective shafts and respective rolls, longitudinal motion of the rolls is also prevented. The placement of the tongue on gear means 34 and the groove on gear means 36 is only for purposes of illustration. It is immaterial which gear means carried the tongue and which carries the groove.

In the drawing, the tongue and groove arrangement is shown perpendicular to the axis of the rolls. This is the best and most preferred angle, but it will be noted that variations of this angle are possible. The invention is not limited to the perpendicular arrangement illustrated.

Novel means for preventing circumferential motion while engraving one roll from another will now be described. After the rolls are first moved into an engraving position, there is a need to insure that there will be no circumferential backlash, which may result in an uneven etching of the master pattern on the second roll from the master roll. Circumferential backlash will cause a break and cause the rolls to lose the exact whole number ratio and every successive full rotation cycle will throw the pattern off more, thus ruining the metallic rolls at great expense.

The novel means for eliminating backlash is best illustrated in FIGS. 2 and 4. In FIG. 2, it has been disclosed that gear means 34 consists of two independently rotatable gears 34' and 34''. It will be well recognized that such adjustable gear means could be affixed to either the engraving roll or the engraved roll. Once the rolls and their respective gears are in a position of contact, the drive gear means 34 may be turned against gear means 36 so that the surface of the teeth which face the direction of turn on gear 34 is positioned tightly against the surface of teeth of gear means 36 which faces away from the direction of turn. Bolts 46 are then loosened and then rotated against the direction of turn of roll 16 by tightening cap screws 49 as cap screws 48 are loosened proportionately, or vice-versa, depending on the direction of roll rotation. The purpose of rotating gear 34'' is so that the surface of the teeth of gear 34'' facing away from the direction of turn are positioned tightly against the side of the teeth of gear 36 which faces in the direction of the turn. Such a rotary adjustment results in wedging the teeth of gear 36 by the teeth of gear 34' and 34'' thereby causing said teeth to be in continuous contact, consequently eliminating circumferential motion by backlash of said gear means 34 and 36. Because gear means 34 and 36 are fixedly secured to shafts 24 and 20 respectively and said shafts 24 and 20 are respectively secured to rolls 16 and 14, circumferential backlash between roll 16 and roll 14 is eliminated.

As is well known in the art, once both rolls have been etched the pattern may be embossed or engraved upon material which is passed between the rolls. Such material can be of various width and the space between the rolls must be accordingly adjusted. When the rolls are separated in preparation for a run of material to be embossed and are then re-engaged according to the width of the new material, the rolls may be out of alignment. The gears may be subject to backlash because the gear teeth may be partially disengaged relative to the width of the space between the rolls.

The means for eliminating backlash with respect to the process of etching the rolls as described above may be re-employed at this time. After the rolls are brought into approximate alignment and the gears tightened down, the rolls may then be altered by a second adjustment means, such a roll register system is shown in FIGS. 2 and 4. In FIGS. 2 and 4, adjustable yoke 52 is shown affixed to the face of gear 36. It is seen that there is space left around pin 58 and bolts 60 at those portions of the pins and bolts which pass through the yoke. No space is provided around the pin and bolts as they engage with gear 36. As is also noted in FIGS. 2 and 4, a portion of pin 56 is tightly engaged with shaft 20, but there is space for rotary motion around that potion of the pin which passes through gear 36 as the shaft is turned. Referring now to FIG. 4, it can be seen that when bolts 60 are loosened and cap screws 59 and 61 are respectively turned that the yoke will turn the shaft but that the gear will remain locked with gear means 34.

A close up of a cross sectional view of the shaft and gear means is shown in FIG. 3. It can be seen that shaft 20 will move as pin 56 is moved through space 54 in gear 36 and that gear 36 will not move.

The improvement in the method of producing embossing or engraving rolls, and of embossing with the rolls will now be described. The novel method is practiced any time there is a need to maintain embossing or engraving rolls in proper circumferential and longitudinal alignment. The method is now described in relation to three separate stages of embossing or engraving, but it will be well understood that the process is complete at any one stage.

In the method of embossing or engraving as described in Pat. No. 3,048,512 to Nelson, a master roll is shown to emboss a first hardened roll which then embosses a second hardened roll. The present process can be used in connection with both steps.

In FIG. 5, the upper roll 16 is a master roll such as is described in the first step of Pat. No. 3, 048,512 and 14 is the first embossing roll or the engraving transfer roll. Means for turning said master roll is identical to that disclosed in FIG. 1. Roll 14 and roll 16 are drivingly connected by gear means 34 and 36 heretofore described. The only distinction from the FIG. 1 disclosure heretofore mentioned is that the double juxtaposed gear means 34 are shown on the bottom roll 14 rather than on the top roll 16.

Gear means 34 corresponds to gear means 34 in FIG. 1 which has been disclosed in detail in FIGS. 2 and 4. The novel method of engraving roll 14 from roll 16 includes the improvement steps of moving roll 16 and roll 14 into engraving position, with gear means 36 and 34 meshing so that the tongue of gear means 34 is received by the groove in gear 36 to prevent longitudinal movement, and rotating gear means 34" by means above described in a counter direction to gear means 34' so as to wedge the teeth of gear 36 and prevent circumferential backlash between the gears. It is understood that the location of the tongue on gear means 34 and the groove in gear means 36 is not critical and that their positions may be reversed.

Once roll 14 is cut from roll 16, the same process may then be used through a similar process to cut a second master roll as shown in FIG. 6.

While the double gear means may be on either the master or first engraved roll, placement on the first engraved roll allows the same gear means to be used in connection with engraving the second roll from the first as heretofore described. Otherwise, two sets of gear means with split gears would be required. The master gear means would have one and the second embossing roll would have the other.

In FIG. 6, roll 14 has become the top engraving roll and roll 16 is now a bottom roll which is to be embossed or engraved, and the double gear means 34 is on the top roll 14 as shown in FIG. 5.

The method of serving circumferential and longitudinal alignment is identical to that disclosed in relation to etching the first roll from the master. However, in the process of etching a second matched roll from a first, the gear means of the second roll may be refined by an etching process. Such a step is disclosed in Pat. No. 2,662,002 and is shown in FIG. 6.

The third stage of embossing for using the novel means for securing and maintaining proper circumferential and longitudinal alignment, is after both rolls are engraved as a matching pair and are used to emboss a given material or web. As heretofore described, the rolls and their respective gear means are moved into embossing or engraving position with the web between said rolls.

With the web placed between the rolls, the rolls are necessarily separated to a degree and the gear means which are secured to the rolls are therefore also partially separated. The separation of the gear means causes the teeth of said gear means to no longer mesh at the pitch line. This in turn allows for play between the gears. To eliminate this play, gear 34" is roated relative to gear 34' as before disclosed and the teeth of gear 34' and 34" then mesh with the teeth of gear means 36 in such a fashion as to effect a new pitch line or constant point of contact as the gears are rotated.

After the gears are locked into position, the roll registry system including gear means 36 is then adjusted as above discussed, and the embossing rolls are then in a desired longitudinal and circumferential alignment for embossing the web.

Obviously many modifications and variations of the present invention are possible in the light of the above teachings.

What is claimed is:

1. Equipment for embossing or engraving purposes, comprising:

first and second rolls each having a shaft on each end, first gear means fixedly secured to the said shaft of the first roll at one end thereof, second gear means disposed on the said shaft of the second roll at the corresponding end thereof for mating with said first gear means, one of said gear means having a circumferential ridge extending radially beyond the teeth of said one gear means so as to form a tongue thereabout, the other of said gear means having a circumferential groove thereabout, complementary to the tongue, for receiving the tongue of said one gear means to effect longitudinal alignment of said rolls, said second gear means including first and second gears each of which are meshable with said first gear means, said first gear being fixedly secured to said shaft of said second roll, first adjusting means for angularly adjusting said second gear relative to said first gear about an axis of rotation of said shaft of said second roll, said first adjuisting means comprising a plate means affixed to said second gear of said second roll, said plate means carrying means for positively effecting angular movement of said second gear relative to said first gear about said axis of rotation of said shaft of said second roll;

means for affixing said second gear to said first gear to maintain said second gear in a selected angular setting relative to said first gear to cause the teeth of the first and second gears to wedge the teeth of said first gear means so as to prevent backlash between said first and second gear means and to maintain circumferential alignment of the respective rolls, and said first gear means being fixedly secured to said shaft of the first roll by second adjusting means for permitting and effecting a selected angular adjustment of said first gear means relative to said shaft of said first roll to thereby permit the registry of said first roll relative to said second roll so that said rolls will be in proper circumferential alignment, said second adjusting means comprising a plate means affixed to said shaft of said first roll, said plate means carrying means for positively effecting angular movement of said first roll relative to said first gear means about said axis of rotation of said shaft of said first roll.

2. A machine having a roll registry system for engraving or embossing purposes comprising:
first and second rolls having respective shafts at each end of each of said rolls,
means including bearings for supporting said rolls in adjacent superposed positions by supporting said shafts at both said ends,
roll rotating means including a gear arrangement to laterally and circumferentially align said rolls,
said rotating means including first and second meshing gear means, each having teeth to effect a gear diameter substantially the same as the diameter of the respective roll,
one of said gear means having a circumferential ridge extending radially beyond the teeth of said one gear means so as to form a tongue thereabout,
the other of said gear means having a circumferential groove thereabout complementary to said tongue and receiving the tongue of said one gear means to effect longitudinal alignment of said rolls,
said first gear means being fixedly secured to said shaft of the first roll by first adjusting means for permitting and effecting a selected angular adjustment of said first gear means relative to said shaft of said first roll to thereby permit the registry of said first roll relative to said second roll so that said rolls will be in proper circumferential alignment,
said first adjusting means comprising a plate means affixed to said shaft of said first roll, said plate means carrying means for positively effecting angular movement of said first roll relative to said first gear means about said axis of rotation of said shaft of said first roll,
said second gear means including first and second gears each of which mesh with said first gear means,
said first gear being fixedly secured to said shaft of said second roll,
second adjusting means for angularly adjusting said second gear relative to said first gear about an axis of rotation of said shaft of said second roll, said second adjusting means comprising a plate means affixed to said second gear of said second roll, said plate means carrying means for positively effecting angular movement of said second gear relative to said first gear about said axis of rotation of said shaft of said second roll;
means for affixing said second gear to said first gear to maintain said second gear in a selected angular setting relative to said first gear to cause the teeth of the first and second gears to wedge the teeth of said first gear means so as to prevent backlash between said first and second gear means and to maintain circumferential alignment of the respective rolls.

References Cited

UNITED STATES PATENTS

| | | | |
|---|---|---|---|
| 415,044 | 11/1889 | Joslin | 74—440 |
| 2,561,018 | 7/1951 | Gegenheimer | 101—248 XR |
| 2,660,002 | 12/1953 | Sunderhauf et al. | 76—107 XR |
| 2,937,591 | 5/1960 | Wagner | 101—23 |
| 3,037,396 | 6/1962 | Martin | 74—409 |
| 3,042,996 | 7/1962 | Nelson | 29—148.4 |
| 3,048,512 | 8/1962 | Nelson | 156—14 |
| 3,141,313 | 7/1964 | Brickett et al. | 74—440 XR |
| 3,214,310 | 10/1965 | DiLeo et al. | 76—107 XR |
| 3,302,558 | 2/1967 | Otto | 101—23 |
| 3,373,627 | 3/1968 | Wesstrom | 74—440 |

FOREIGN PATENTS 717,486  10/1954  Great Britain.

C. D. CROWDER, Assistant Examiner

ROBERT E. PULFREY, Primary Examiner

U.S. Cl. X.R.

74—409; 101—248